(12) United States Patent
Johnson et al.

(10) Patent No.: US 7,722,779 B2
(45) Date of Patent: May 25, 2010

(54) METHOD AND ETCHANT FOR REMOVING GLASS-COATING FROM METAL WIRES

(75) Inventors: Francis Johnson, Clifton Park, NY (US); Luana Emiliana Iorio, Clifton Park, NY (US); Lawrence B. Kool, Clifton Park, NY (US); Gabriel K. Ofori-Okai, Albany, NY (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 11/724,146

(22) Filed: Mar. 14, 2007

(65) Prior Publication Data

US 2008/0223819 A1    Sep. 18, 2008

(51) Int. Cl.
  *C03C 15/00*  (2006.01)
  *C03C 25/68*  (2006.01)
  *C25F 3/00*   (2006.01)
(52) U.S. Cl. .................... 216/96; 216/13; 216/109
(58) Field of Classification Search ............ 216/13, 216/96; 205/640; 438/745
See application file for complete search history.

(56) References Cited

U.S. PATENT DOCUMENTS

| 4,376,057 A * | 3/1983 | Angelo et al. ............... 252/79.4 |
| 2003/0062271 A1 * | 4/2003 | Kool et al. .................. 205/717 |

* cited by examiner

*Primary Examiner*—Roberts Culbert
(74) *Attorney, Agent, or Firm*—James W. Pemrick; Ernest G. Cusick; Frank A. Landgraff

(57) ABSTRACT

An etchant for and method of removing a glass coating on a metallic wire is provided. The etchant comprises an acid solution having metal ions contained therein. The metal ions prevent the acid solution from pitting or damaging the metallic wire, while allowing the acid solution to effectively etch and remove the glass coating. In one embodiment, a fluorine-based acid solution can be used. In another embodiment, a glass coated, metal alloy microwire is etched and the metal ions added to the etchant are chosen to be the same as the majority constituent element in the metal alloy. The glass coating can be either removed in full or only partially removed.

20 Claims, 3 Drawing Sheets

METHOD AND ETCHANT FOR REMOVING GLASS-COATING FROM METAL WIRES

BACKGROUND OF THE INVENTION

The present invention relates generally to a method of removing a glass coating that surrounds a metal wire core in a manner that protects the surface of the metal core from damage. In particular, the invention relates to the removal of the silica-based glass coating that surrounds an amorphous metal microwire.

Metal microwires can be produced by the Taylor-Ulitovsky production process (reference U.S. Published Patent Application 2006/0130995 A1 to Adar et al.). In this process, an alloy melt is rapidly solidified in a softened glass sheath. The presence of the softened glass sheath dampens instability in the alloy melt and promotes the formation of a glass-coated microwire with a uniform diameter and a smooth metal/glass interface. A glass-coated microwire with an amorphous metal core can also be produced by the Taylor-Ulitovsky method, in which a glass tube and the desired metal are brought into a high-frequency induction field. The metal is melted, and its heat softens the glass tube, so that a thin metal-filled capillary is drawn from the softened glass tube. The metal-filled capillary enters a cooling zone in a superheated state where it is rapidly cooled, such that the desired amorphous or micro-crystalline (i.e., grain size less than about 1 micrometer), micro-structure is obtained. Rapid cooling is typically required to obtain amorphous and micro-crystalline microstructures. The rate of cooling is not less than $10^4$ degrees C./sec and preferably is $10^5$-$10^6$ degrees C./sec. The amorphous or micro-crystalline structure is controlled by choice of amorphous alloy, cooling rate, nature of the cooling liquid, location of the cooling stream, dwell time in the cooling stream and degree of super-heating and super-cooling.

For some applications it is important to subsequently remove the glass coating from the microwire. One exemplary application is the use of the microwire as an anode wire in a proportional radiation counter or neutron detector. In this application, charged particles must be able to make electrical contact with the bare metal surface of the wire. Removal of the glass-coating is desirable for the operation of the detector because: 1) incident electrons caused by ionization of the gas in the detector chamber should be free to impact the anode wire surface in order to produce a detector signal, and 2) the ends of the anode wire should make an electrical connection with the ends of the detector. During operation of the detector a radially symmetric electric field is caused to exist between the anode wire and the cathode shell of the detector. Symmetry of this field and consistency of the field gradient requires an anode wire with a smooth surface and a constant (i.e., uniform) diameter. Furthermore, some applications may require position-sensitive detectors in which the ionization event is localized by measuring the difference in arrival times of the detector signal at each end of the detector assembly. Accuracy of the position measurement depends on the anode wire having a constant resistance along its length. Therefore, the diameter of the anode wire must be constant along the length of the detector.

It is well-known in the art that hydrofluoric acid (HF) is effective at dissolving silica-based glass compositions. Hydrofluoric acid dissolves glass by reacting with silicon dioxide ($SiO_2$), the major component in most glasses. However, the dissolution process cannot be well-controlled. When using hydrofluoric acid to remove the glass coating from a wire it is difficult to avoid etching and pitting the metal core. An etched and pitted metal core no longer exhibits a smooth surface and uniform diameter, which is detrimental to many applications (e.g., neutron detection). Therefore, a need exists for a method to controllably and quickly remove the glass coating without damaging the metal core of a glass-coated wire while maintaining the wire's uniform diameter.

BRIEF DESCRIPTION OF THE INVENTION

One aspect of the present invention relates to a fluorine-based acid solution used to controllably remove a glass coating from a conductor. Metal ions are added to the acid solution to protect the conductor during the etching process.

In another aspect of the present invention, a method is provided for using an acid solution to remove an insulating coating from a conductor. Metal ions are added to the acid solution to protect the conductor during the etching process.

In another aspect of the invention, a method is provided for etching the insulating coating from a conductor. The conductor is formed of a metal alloy having constituent elements. The coated conductor is etched in a fluorine-based acid solution. The acid solution comprises at least one of, hydrofluoric acid, hydrofluorosilicic acid, fluoric acid, fluohydric acid, hydrofluoride, or fluorine monhydride. The acid solution is saturated with metal ions of the same type as, at least one of, the metal alloy constituent elements.

DETAILED DESCRIPTION OF THE INVENTION

Figure 1:
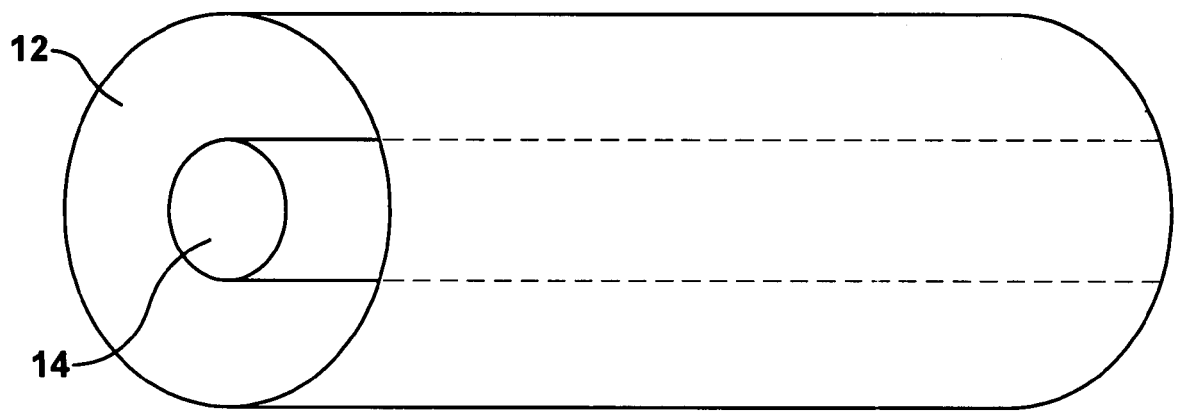
FIG. 1 is an isometric view of a glass-coated wire.

One aspect of the invention relates to a process by which a glass-coated wire is exposed to an acid solution. In one example, the glass-coated wire is a microwire, and is introduced in the acid bath in a discrete batch, exposed to the solution for a specified time, and then removed and rinsed. In another example, the glass-coated wire is continuously drawn on an arrangement of spools and pulleys through an acid-solution bath, out of the solution, and through a rinse bath. In this example, the rate of motion of the spools and the size of the baths determine the exposure time. One example of a process is the reduction in the thickness of the glass coating at a defined rate of removal, with the end result being the removal, either full removal or partial removal, of the glass coating from the metal substrate or core. Hereinafter, removal of the insulating coating will be understood to include full or partial removal.

The wire can be formed of a metal alloy containing one or more, or combinations of aluminum, chromium, cobalt, copper, gold, iron, lead, nickel, palladium, platinum, silver, tin, titanium, tungsten, and zirconium. The metal alloy used in the wire can be amorphous, crystalline or micro-crystalline. Additionally, the wire composition can be chosen to include one or more elements from the following classes: (1) ferrous amorphous (e.g., Fe, Co, Ni, Cr, Mn, Ga, Al, Si, Cr, Nb, Vr, Hf, B, C, and P), (2) non-ferrous amorphous (e.g., Al Ti, Zr, Be, Nb, Ga, La, Y, Pd, Ni, Cu, Zn, B, P, Si, and Sn), (3) ferrous crystalline (e.g., Fe, Co, Ni, Mo, Cr, C, and B), or (4) non-ferrous crystalline (e.g., Al, Cu, W, Au, Pt, Pd, Rh, Cr, and Mn).

The insulating coating on the wire is typically a glass, but the coating could also be ceramic or glass-ceramic material. Examples of insulating coatings are glass, silicon dioxide, phosphosilicate glass (PSG), boro-phosphosilicate glass (BPSG), aluminum oxynitride, barium titanate, beryllium oxide, boron nitride, cerium hexaboride, germanium dioxide, hafnium diboride, lanthanum gallium silicate, lanthanum hexaboride, lead zirconate titanate, magnesium oxide, molybdenum silicide, silicon carbide, silicon nitride, strontium titanate, titanium boride, tungsten nitride, and tungsten silicide, or combinations thereof.

The glass-coated wire is preferably etched in a fluorine-based acid solution. Examples of fluorine-based acid solutions are hydrofluoric acid (HF), hydrofluorosilicic (HFS) acid, fluoric acid, fluohydric acid, hydrofluoride, fluorine monhydride, or a mixture of hydrofluoric (HF) and hydrofluorosilicic (HFS) acid. The invention also contemplates various combinations of the previously mentioned fluorine-based acids.

Hydroxide compounds can also be used to etch the glass coating, however, these are less preferred due to the need to maintain high pressures and temperatures to be effective. Examples of hydroxide compounds are: sodium hydroxide (NaOH), potassium hydroxide (KOH), caesium hydroxide (CsOH), tetramethylammonium hydroxide ((CH3)4NOH). Phosphoric acid could also be used, however, it would have a very long reaction time. The invention also contemplates the use of plasma (i.e., dry) etching as a means for removing the glass coating.

It is possible to control the etching process by adjusting the chemistry of the acid solution. Alternative fluorine-containing ionic species may be introduced to adjust the kinetics of the reaction with the silica glass. Metal ions may also be introduced that control the activity of the solution relative to the alloy constituents of the metal core. These metal ions, as embodied by the invention, prevent the dissolution of the alloy and thus protect the surface and protect the surface finish and diameter of the metal core. If metal ions are not added to the acid solution, the metal wire can be pitted and damaged to the point where it can not be used in the application.

One or more types of metal ions can be introduced to the acid solution to prevent the pitting and/or etching of the metal wire surface. In one example, cobalt metal is dissolved into the acid solution to ensure the presence of an excess of cobalt$^{+2}$ ions. This impedes the dissolution of a cobalt-alloy upon the removal of the glass coating and prevents pitting of the wire surface. Alternatively, the cobalt$^{+2}$ ions may be introduced by adding a cobalt salt, including but not limited to, $CoSiF_6$, $Co(HSiF_6)_2$, and/or $CoCO_3$. In this example, it is important that the metal ions that are used be the majority alloy constituents of the metal core. Majority alloy constituent is defined as the element in greatest quantity within the alloy. For example, the majority alloy constituent in an alloy comprised of 60% cobalt and 40% iron (i.e., $CO_{60}Fe_{40}$), would have cobalt as the majority alloy constituent (i.e., 60% is greater than 40%). Also in this example, it is important to control the valence of the metal ions in the acid solution to prevent their reaction with the metal core. One way to control the valence is to ensure that an excess of cobalt metal is present in the solution to avoid the formation of cobalt$^{+3}$ ions. Cobalt$^{+3}$ ions will react with Co atoms present on the wire surface to form cobalt$^{+2}$, which can damage the wire surface due to pitting. Additionally, the presence of oxygen can oxidize cobalt$^{+2}$ ions to cobalt$^{+3}$ ions. As another specific example, the wire is formed of a ferrous-amorphous metal, $Co_{66.5}Fe_4Cr_4Si_{12}B_{13.5}$. For this type of wire, cobalt metal powder is added to the etching solution to prevent the solution from etching or pitting the wire surface. In this example, cobalt is the majority constituent of the metal alloy (i.e., cobalt at 66.5% versus iron at 4% versus chromium at 4% versus silicon at 12% versus boron at 13.5%) and is chosen as the metal ion to be added to the etching solution. It is important that the etching solution is saturated with the metal powder; providing an excess of metal guarantees that this is accomplished.

FIG. 1 illustrates an exemplary geometry of a glass-coated metal wire. The glass-coating 12 is disposed on the surface of a metal core 14 and is continuous along its length. The core 14 is solid metal and retains a sharp interface with the glass coating 12. Wires of this type are typically referred to as microwires due to their extremely small diameters, on the order of 1-200 microns. Alternatively, the wires could be oval, square, rectangular, trapezoidal or any other shape in cross-section. One process that can be used to fabricate glass-coated metal wires is the Taylor-Ulitovsky process. The metal cores 14, obtained with the Taylor-Ulitovsky process, typically range between 0.5-150 microns thick and the glass coating 12 typically ranges between 1-50 microns thick. The diameter of the core 14 and thickness of the coating 12 may be controllably varied according to the requirements of the application.

Figure 2:
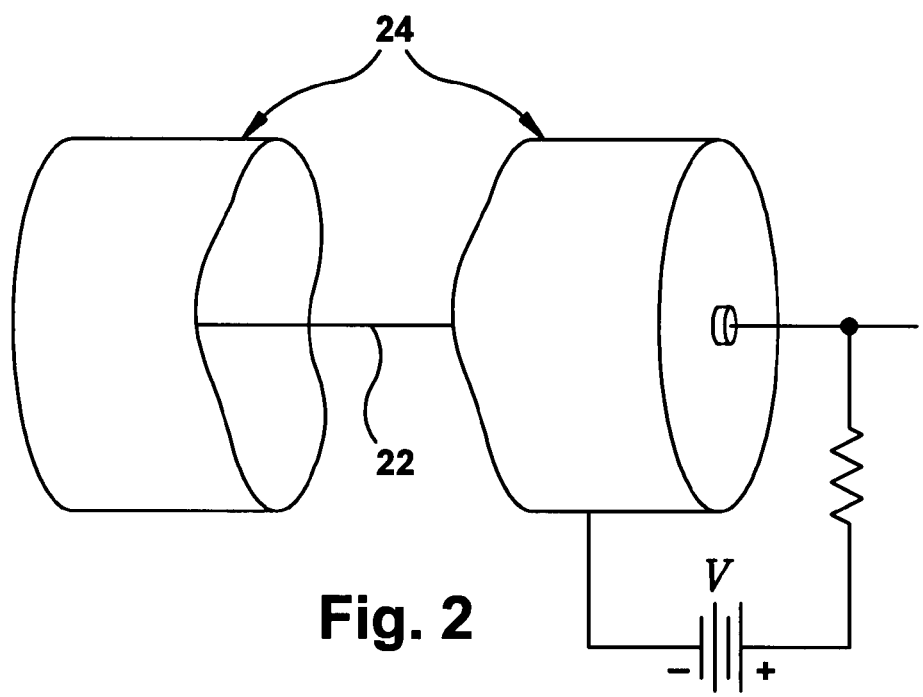
FIG. 2 is a schematic illustration of a proportional neutron counter with an anode wire fabricated from an amorphous metal microwire.

FIG. 2 is a schematic of a gas-filled proportional radiation detector with an amorphous metal anode wire 22 and a cathode 24. The amorphous metal anode wire 22 is manufactured from glass-coated microwire that has had the glass coating removed. A proportional radiation detector is a gas-filled device that, when a high voltage V is applied, creates an electrical pulse when a neutron interacts with the gas. The absorption of a neutron causes the prompt emission of a nucleus or proton respectively. These charged particles can then cause ionization in the gas, which is collected as an electrical pulse. Through the use of electronic discriminator circuits, the amount of radiation can be measured by monitoring the change in resistance.

Figure 3:
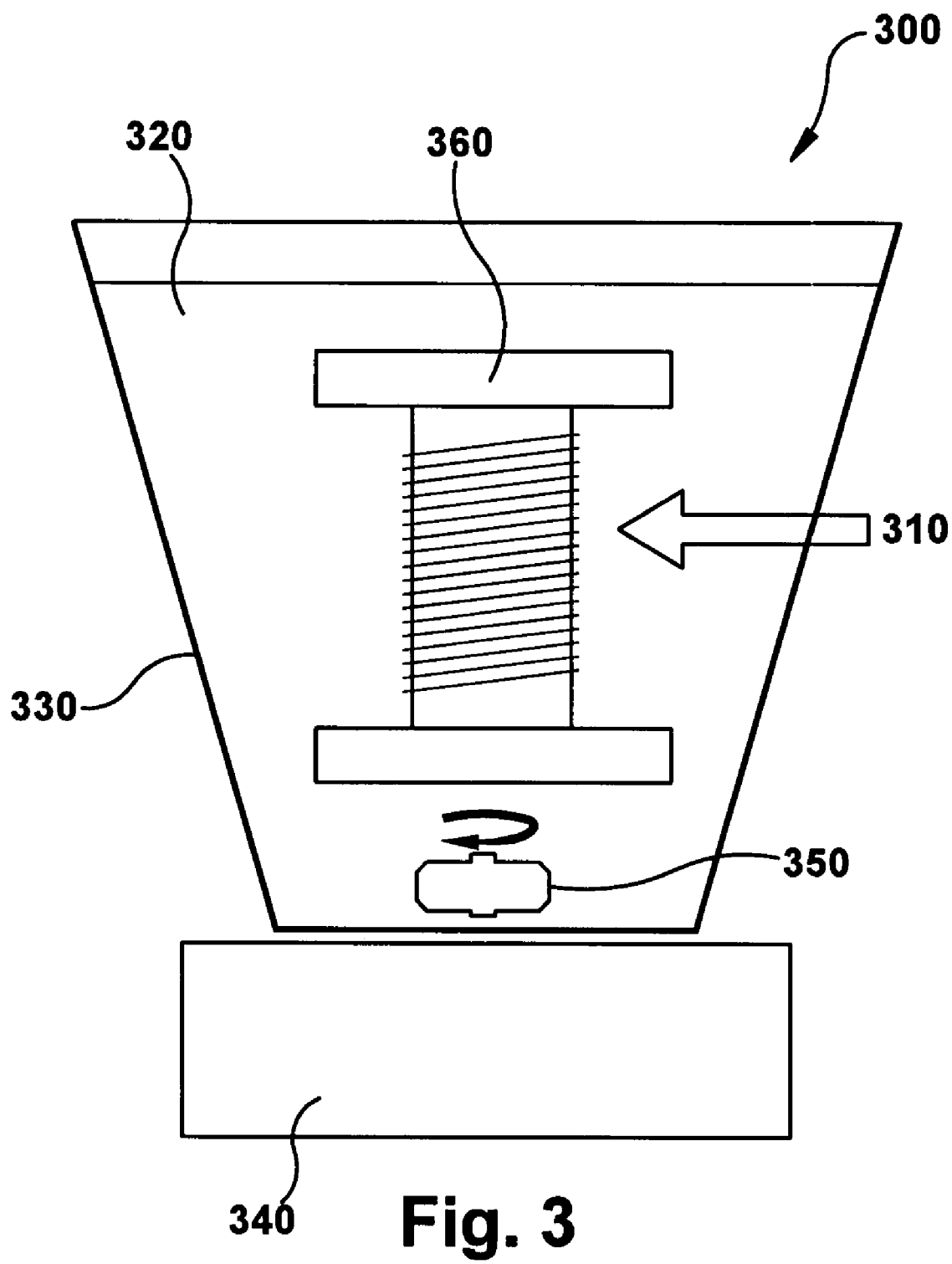
FIG. 3 is a schematic illustration of a glass-removal process in which the glass-coated wire is introduced into the wire in discrete batch.

FIG. 3 is a schematic illustration of a glass-removal apparatus 300, as embodied by the invention, in which a wire 310 is exposed to acid 320 in discrete batches. The acid 320 could be a fluorine-based acid, and is used to remove the glass coating from wire 310. In this apparatus, acid 320 is placed in non-reactive beaker 330 (such as a beaker formed of Teflon™) that is placed atop a magnetic stirring plate 340. A plastic-coated stirring magnet 350 can be placed at the bottom of the beaker 330. The glass-coated microwire 310 is placed on a non-reactive spool 360 (such as Teflon™) and submerged in the acid solution 320 for the required time. The magnetic stirring plate 340 induces the stirring magnet 350 to spin, and in so doing, agitates and stirs the acid 320. The agitated acid 320 flows around the wire 310 and reacts with the glass coating. The flow induced by the stirring magnet 350 ensures that the wire 310 is uniformly exposed to acid 320. Alternatively, the wire 310 may be wound around the stirring magnet 350. After glass removal, the spool 360 is removed from the solution, rinsed and dried. The wire 310 can be rinsed in deionized water or any other suitable rinsing solution. The wire 310 can be dried in ambient air or by using a heated airflow, or any other suitable means for drying wire 310 can be employed.

Figure 4:
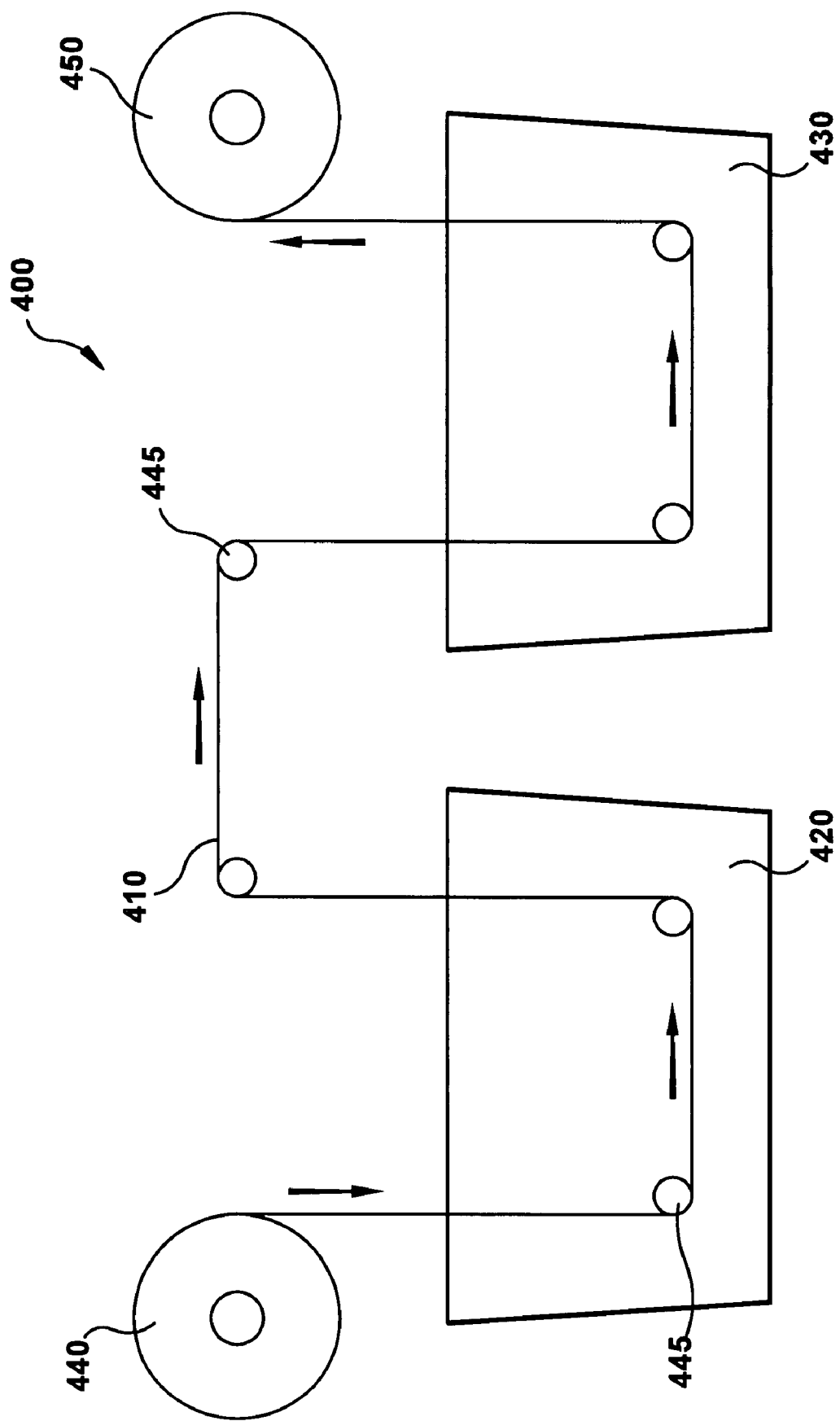
FIG. 4 is a schematic illustration of a glass-removal process in which the glass-coated wire is continuously drawn through an acid bath and a rinse bath.

FIG. 4 is a schematic illustration of another glass-removal apparatus 400, as embodied by the invention, the apparatus 400 provides the wire 410 to be drawn continuously through an acid solution 420 and then drawn through a rinse bath 430.

The wire 410 is fed out from a source spool 440 and wound around a system of pulleys 445 that allow the wire 410 to be submerged in the acid solution 420 and the rinse bath 430. The wire 410 is taken up on a take up spool 450 that is run by a variable speed motor drive (not shown). The residence time of the wire in the acid bath is determined by the speed of the motor and the length of wire submerged in the bath during operation. Examples of acid solution 420 could be fluorine-based acids or any other suitable acid used to dissolve insulating coatings. Examples of fluorine-based acid solutions are hydrofluoric acid (HF), hydrofluorosilicic (HFS) acid, fluoric acid, fluohydric acid, hydrofluoride, fluorine monhydride, or a mixture of hydrofluoric (HF) and hydrofluorosilicic (HFS) acid. The invention also contemplates various combinations of the previously mentioned fluorine-based acids. Examples of other acids are sodium hydroxide (NaOH), potassium hydroxide (KOH), caesium hydroxide (CsOH), tetramethylammonium hydroxide ((CH3)4NOH), and phosphoric acid. Rinse bath 430 could be deionized water or any other suitable rinsing agent used to neutralize acid 420. The pulley system 445 can be a series of pulleys that are comprised of materials resistant to acid 420 and rinsing bath 430. Means (not shown in the drawing) can also be provided to replenish any loss of acid 420 or rinse bath 430. Appropriate level sensors or level sensing circuitry and devices (not shown) can also be provided to monitor the respective levels of acid 420 and rinse bath 430.

Microwires can also be used in magnetic sensing applications. In magnetic sensing applications it can be useful to partially remove the glass coating from the microwire. The magnetic response of the microwire core is related to the stress state of the microwire. The glass coating imparts a compressive axial stress on the wire, and this stress is a function of the thickness of the glass coating. As the thickness of the glass coating changes, the stress on the microwire changes, and therefore the magnetic response also changes. A specific magnetic response of the microwire can be obtained, by uniformly reducing the thickness of the glass coating by a predetermined amount.

Exemplary embodiments of a method and etchant for removing or etching an insulating coating are described above in detail. While the invention has been described in terms of various specific embodiments, those skilled in the art will recognize that the invention can be practiced with modification within the spirit and scope of the following claims.

What is claimed is:

1. A method of removing an insulative coating from a conductor by chemical etching, the method comprising:
   providing a conductor formed of a metal alloy having an insulative coating, said metal alloy comprising constituent elements, one of said constituent elements being a majority constituent element, said majority constituent element comprising the majority of said conductor;
   exposing said conductor to an acid solution, wherein said acid solution contains metal ions, said acid solution comprising at least one, or combinations of, hydrofluoric acid, hydrofluorosilicic acid, fluoric acid, fluohydric acid, hydrofluoride or fluorine monhydride, and
   wherein said metal ions are substantially the same type of element as said majority constituent element.

2. A method as defined in claim 1, wherein said conductor is formed from at least one, or combinations, of:
   aluminum (Al), beryllium (Be), boron (B), carbon (C), chromium (Cr), cobalt (Co), copper (Cu), gallium (Ga), gold (Au), hafnium (Hf), iron (Fe), lanthanium (La), lead (Pb), manganese (Mn), molybdenum (Mo), nickel (Ni), niobium (Nb), palladium (Pd), phosphorous (P), platinum (Pt), rhodium (Rh), silicon (Si), silver (Ag), tin (Sn), titanium (Ti), tungsten (W), yttrium (Y), zinc (Zn), and zirconium (Zr).

3. A method as defined in claim 1, wherein said insulative coating comprises at least one, or combinations, of the following:
   glass, silicon dioxide, phosphosilicate glass (PSG), borophosphosilicate glass (BPSG), aluminum oxynitride, barium titanate, beryllium oxide, boron nitride, cerium hexaboride, germanium dioxide, hafnium diboride, lanthanium gallium silicate, lanthanum hexaboride, lead zirconate titanate, magnesium oxide, molybdenum silicide, silicon carbide, silicon nitride, strontium titanate, titanium boride, tungsten nitride, and tungsten silicide.

4. A method as defined in claim 1, wherein said acid solution comprises at least one, or combinations of:
   hydrofluoric acid, hydrofluorosilicic acid, fluoric acid, fluohydric acid, hydrofluoride, fluorine monhydride, sodium hydroxide, potassium hydroxide, caesium hydroxide, tetramethylammonium hydroxide, and phosphoric acid.

5. A method as defined in claim 1, wherein said acid solution comprises a fluorine-based acid solution containing at least one, or combinations, of:
   hydrofluoric acid, hydrofluorosilicic acid, fluoric acid, fluohydric acid, hydrofluoride, and fluorine monhydride.

6. A method as defined in claim 1, wherein said metal ions are selected from the group comprising at least one, or combinations, of:
   aluminum (Al), beryllium (Be), boron (B), carbon (C), chromium (Cr), cobalt (Co), copper (Cu), gallium (Ga), gold (Au), hafnium (Hf), iron (Fe), lanthanium (La), lead (Pb), manganese (Mn), molybdenum (Mo), nickel (Ni), niobium (Nb), palladium (Pd), phosphorous (P), platinum (Pt), rhodium (Rh), silicon (Si), silver (Ag), tin (Sn), titanium (Ti), tungsten (W), yttrium (Y), zinc (Zn), and zirconium (Zr).

7. A method as defined in claim 1, further comprising removing the insulative coating by submerging at least a portion of said conductor and said insulative coating in said acid solution for a predetermined period of time.

8. A method as defined in claim 7, wherein said predetermined period of time is between about 5 minutes to about 3 hours.

9. A method as defined in claim 7, wherein said predetermined period of time is between about 10 minutes to about 30 minutes.

10. A method as defined in claim 7, further comprising immersing a discrete batch of said conductor in said acid solution.

11. A method as defined in claim 7, further comprising drawing said conductor and said insulative coating through said acid solution at a predetermined rate of speed.

12. A method as defined in claim 11, wherein said predetermined rate of speed is between about 2 to about 8 centimeters per minute, said rate of speed providing an exposure time of said insulative coating to said acid solution of between about 5 minutes to about 3 hours.

13. A method as defined in claim 1, wherein at least a portion of the metal ions are dissolved in said acid solution to a point of saturation, the point of saturation defined by either the point at which said acid solution can dissolve no additional metal ions, or the point at which an excess of metal ions are present in solid form in said acid solution.

14. A method for etching an insulating coating on a conductor, comprising;
  providing a conductor formed of a metal alloy, said metal alloy comprising constituent elements, one of said constituent elements being a majority constituent element, said majority constituent element comprising the majority of said conductor;
  etching said insulating coating in a fluorine-based acid solution containing metal ions, said acid solution comprising at least one, or combinations of, hydrofluoric acid, hydrofluorosilicic acid, fluoric acid, fluohydric acid, hydrofluoride, or fluorine monhydride, and
  wherein said metal ions are the same type of element as said majority constituent element.

15. A method as defined in claim 14, wherein said insulating coating is comprised of at least one, or combinations of:
  glass, silicon dioxide, phosphosilicate glass (PSG), borophosphosilicate glass (BPSG), aluminum oxynitride, barium titanate, beryllium oxide, boron nitride, cerium hexaboride, germanium dioxide, hafnium diboride, lanthanium gallium silicate, lanthanum hexaboride, lead zirconate titanate, magnesium oxide, molybdenum silicide, silicon carbide, silicon nitride, strontium titanate, titanium boride, tungsten nitride, and tungsten silicide.

16. A method as defined in claim 14, wherein said metal alloy is amorphous, crystalline or mocro-crystalline in structure and contains at least one, or combinations of the following:
  aluminum (Al), beryllium (Be), boron (B), carbon (C), chromium (Cr), cobalt (Co), copper (Cu), gallium (Ga), gold (Au), hafnium (Hf), iron (Fe), lanthanium (La), lead (Pb), manganese (Mn), molybdenum (Mo), nickel (Ni), niobium (Nb), palladium (Pd), phosphorous (P), platinum (Pt), rhodium (Rh), silicon (Si), silver (Ag), tin (Sn), titanium (Ti), tungsten (W), yttrium (Y), zinc (Zn), and zirconium (Zr).

17. A method as defined in claim 16, wherein said metal ions are chosen from the group, comprising:
  aluminum (Al), beryllium (Be), boron (B), carbon (C), chromium (Cr), cobalt (Co), copper (Cu), gallium (Ga), gold (Au), hafnium (Hf), iron (Fe), lanthanium (La), lead (Pb), manganese (Mn), molybdenum (Mo), nickel (Ni), niobium (Nb), palladium (Pd), phosphorous (P), platinum (Pt), rhodium (Rh), silicon (Si), silver (Ag), tin (Sn), titanium (Ti), tungsten (W), yttrium (Y), zinc (Zn), and zirconium (Zr).

18. A method as defined in claim 14, wherein at least a portion of the metal ions are dissolved in said acid solution to a point of saturation, the point of saturation defined by either the point at which said acid solution can dissolve no additional metal ions, or the point at which an excess of metal ions are present in solid form in said acid solution.

19. A method as defined in claim 14, further comprising removing the insulative coating by submerging at least a portion of said conductor and said insulative coating in said acid solution for a predetermined period of time.

20. A method as defined in claim 19, further comprising immersing a discrete batch of said conductor in said acid solution.

* * * * *